(12) United States Patent
Jackson (10) Patent No.: US 10,094,488 B2
(45) Date of Patent: Oct. 9, 2018

(54) BALANCED VALVE TRIM AND METHOD OF REDUCING STEM FORCES ON A VALVE STEM

(71) Applicant: FISHER CONTROLS INTERNATIONAL LLC, Marshalltown, IA (US)

(72) Inventor: Trenton Frank Jackson, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 107 days.

(21) Appl. No.: 14/974,103

(22) Filed: Dec. 18, 2015

(65) Prior Publication Data

US 2017/0130868 A1 May 11, 2017

Related U.S. Application Data

(60) Provisional application No. 62/251,499, filed on Nov. 5, 2015.

(51) Int. Cl.
*F16K 39/02* (2006.01)
*F16K 1/12* (2006.01)
(Continued)

(52) U.S. Cl.
CPC .............. *F16K 39/02* (2013.01); *F16K 1/12* (2013.01); *F16K 1/36* (2013.01); *F16K 1/38* (2013.01);
(Continued)

(58) Field of Classification Search
CPC .......... F16K 39/02; F16K 39/022; F16K 1/12; F16K 1/36; F16K 1/38; F16K 47/04; G05D 7/01
(Continued)

(56) References Cited

U.S. PATENT DOCUMENTS 3,085,590 A * 4/1963 McIlhenny .......... G05D 7/0126
137/501
3,318,577 A * 5/1967 Banks ................... F16K 39/022
137/516.27
(Continued)

FOREIGN PATENT DOCUMENTS

JP 2000055211 A 2/2000

OTHER PUBLICATIONS

International Search Report for PCT/US2016/060482, dated Jan. 27, 2017.
Written Opinion for PCT/US2016/060482, dated Jan. 27, 2017.

*Primary Examiner* — Ian Paquette
(74) *Attorney, Agent, or Firm* — Marshall, Gerstein & Borun LLP (57) ABSTRACT

Valve trim for a valve includes a valve plug having one or more balance ports located along the outer surface of a tapered nose portion of the valve plug. Each balance port is located to be downstream of the throat and spaced from the tip of the tapered nose portion of the valve plug. The valve trim may be use, for example, in a high recovery angle body valve. A high recovery valve with the valve trim may have better recovery performance as well as a smaller spike in stem force through the choked flow transition point. A method of reducing stem forces on a valve stem of sliding stem valve is also provided.

18 Claims, 7 Drawing Sheets

(51) Int. Cl.
*F16K 1/36* (2006.01)
*F16K 47/04* (2006.01)
*G05D 7/01* (2006.01)
*F16K 1/38* (2006.01)

(52) U.S. Cl.
CPC ............ *F16K 39/022* (2013.01); *F16K 47/04* (2013.01); *G05D 7/01* (2013.01)

(58) Field of Classification Search
USPC .......................................................... 251/122
See application file for complete search history.

(56) References Cited

U.S. PATENT DOCUMENTS

| | | | |
|---|---|---|---|
| 3,542,056 A | | 11/1970 | Chinn |
| 3,601,147 A | * | 8/1971 | Myers ................... F16K 39/022 251/282 |
| 3,700,209 A | * | 10/1972 | Usry ..................... F16K 39/022 251/282 |
| 3,892,384 A | | 7/1975 | Myers |
| 6,568,656 B1 | | 5/2003 | Wrocklage |
| 6,725,876 B2 | * | 4/2004 | Bowman ................. F02C 7/232 137/312 |
| 8,038,121 B2 | * | 10/2011 | Gessaman ................. F16K 1/38 251/122 |
| 2010/0170583 A1 | | 7/2010 | Gessaman |

* cited by examiner

BALANCED VALVE TRIM AND METHOD OF REDUCING STEM FORCES ON A VALVE STEM

FIELD

This application relates generally to flow control valves, and more specifically to a balanced valve trim for a flow control valve and a method of reducing stem forces on a valve stem of sliding stem valve.

BACKGROUND

Valve trim for a flow control valve typically refers to the internal components of a valve that modulate the flow of the controlled fluid. The components of the valve trim vary from valve type to valve type. However, a valve trim typically includes at least a flow control orifice and a flow control member that cooperates with the flow control orifice to control the flow of fluid through the orifice and, subsequently, through the valve. Many valve trims include additional components, such as a valve stem, a cage, and/or other internal components. However, the focus of this application is primarily on the flow control member and the flow control orifice, it being understood that a valve trim may include additional components.

Figure 1:
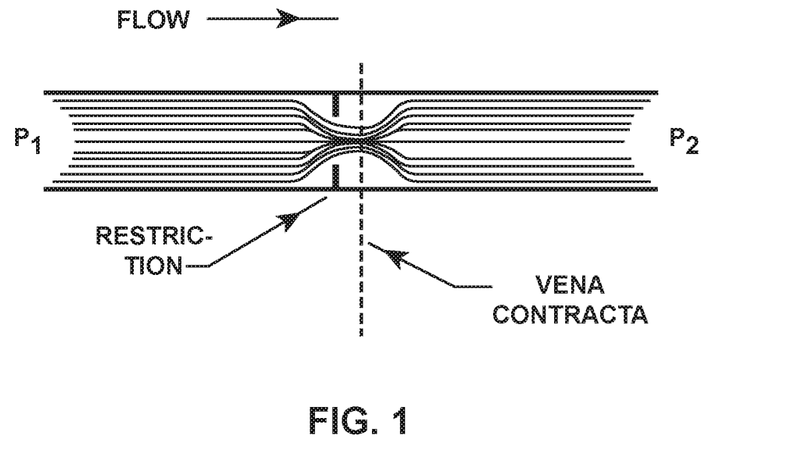
FIG. 1 is a schematic representation of fluid flow through a typical converging-diverging nozzle.

A high recovery valve is a valve design that dissipates relatively little flow stream energy due to streamlined internal contours and minimal flow turbulence. A high recovery valve typically includes a flow control member in the form of a valve plug and an orifice with a generally hourglass-shaped inner wall surface. Thus, the geometry of a high recovery valve typically simulates a converging-diverging nozzle. For example, FIG. 1 illustrates a generic converging-diverging nozzle geometry and shows the fluid flow through the restriction and the vena contracta with an inlet pressure upstream of the restriction, i.e., stagnation pressure P1, and an outlet pressure downstream of the restriction, i.e., back pressure P2.

Figure 2:
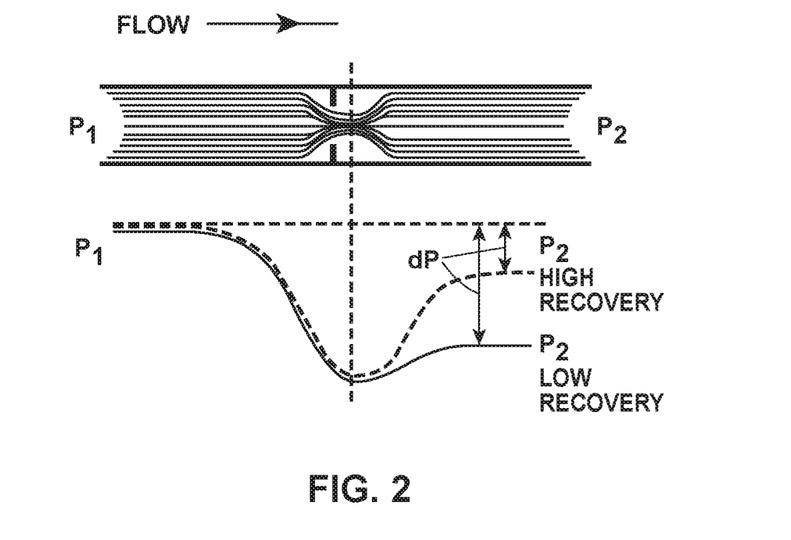
FIG. 2 is a schematic representation comparing pressure profiles of fluid flow through a typical high recovery valve relative to a typical low recovery valve.

In a high recovery valve, pressure downstream of the vena contracta recovers to a high percentage of its inlet value. FIG. 2 illustrates a comparison of typical pressure profiles for high and low recovery valves. As can be seen in FIG. 2, in both high and low recovery valves there is a pressure differential dP between the stagnation pressure P1 and the back pressure P2 across the valve throat. Thus, dP=P1−P2. Here, the valve throat is modeled as a simple vena contracta. However, the back pressure P2 of the high recovery valve returns closer to the stagnation pressure P1 than the back pressure of the low recovery valve. Nevertheless, the pressure differential dP across the valve throat creates a stem force Fs on a valve stem attached to a valve plug at the valve throat.

SUMMARY

The present disclosure provides a valve plug, a valve trim, a valve, and a method that, in some arrangements, may reduce some stem forces caused by differential pressure across the valve plug and/or improve pressure recovery on the downstream side of the valve plug.

According to some aspects, a valve plug for a flow control valve is provided. The valve plug may include one or more balance ports through an outer surface of a tapered nose portion of the valve plug. The balance ports may be vented through the valve plug to equalize a first pressure along the tapered nose portion with a second pressure at a back end of the valve plug body. The balance ports may extend through an outer surface of a tapered nose portion of the valve plug spaced apart from a tip at a distal end of the tapered nose portion. The balance ports may be spaced apart from a shoulder at a junction of the tapered nose portion and a body portion of the valve plug. The balance ports may extend through the outer surface of the tapered nose portion between and spaced from the shoulder and the tip. The balance ports may vent through the valve plug via a single bore or multiple bores extending through the body portion. Where more than one balance port is provided, each balance port may be spaced the same distances from the shoulder and/or the tip, or different balance ports may be spaced different distances form the shoulder and/or the tip.

According to some aspects, a valve trim for a flow control valve is provided. The valve trim preferably includes a valve plug according to any of the aspects, arrangements, and/or features of the present disclosure. The valve trim may also include an orifice. The orifice may have a flow passage defined by an inner wall surface extending from an inlet to an outlet, and the valve plug may be arranged to reciprocate linearly into the flow passage to control the flow of fluid through the flow passage. The orifice may have the form of a converging-diverging nozzle, the inner wall surface including and/or defining a converging section, a vena contracta, and a diverging section. The orifice may include a valve seat along the inner wall surface. The valve seat may be disposed along the converging section of the inner wall surface.

According to some aspects, a valve is provided. The valve preferably includes a valve plug according to any of the aspects, arrangements, and/or features of the present disclosure. The valve may include may include a valve body defining a fluid flow path extending from an inlet to an outlet. A valve trim according to any of the aspects, arrangements, and/or features of the present disclosure, including the valve plug, may be operatively disposed in the valve body to control flow of fluid along the fluid flow path. The valve may be high recovery valve. The valve may be an angle body valve. The valve may be a sliding stem valve.

According to some aspects, a method of reducing stem forces on a valve stem of sliding stem valve is provided. The sliding stem valve may include a valve plug according to any of the aspects, arrangements, and/or features disclosed herein. The sliding stem valve may include an orifice according to any of the aspects, arrangements, and or features disclosed herein. A first pressure at the back end of a body portion of a valve plug coupled to the valve stem may be equalized with a second pressure at point located between a throat and a tip of the valve plug, wherein the throat is formed between an outer surface of the valve plug and the inner surface of the orifice. The pressures may be equalized by venting fluid from a location on the outer surface of the tapered nose portion spaced apart from the tip. The fluid may be vented through a balance port extending through the outer surface of the tapered nose portion. The balanced port may be spaced a first distance from a shoulder of the valve plug and a second distance from the tip.

Any one or more of these aspects may be combined with any one or more of the other aspects and/or additional aspects, arrangements, features, and/or technical effects that are apparent upon detailed inspection of the figures and the following description.

DETAILED DESCRIPTION

Methods and systems according to the present disclosure may have many different aspects, arrangements, and features in many different various combinations. Any one or more of the aspects, arrangements, and features disclosed herein may be combined with any one or more of the other aspects, arrangements, and features in any way suitable for providing any one or any combination of technical aspects in any useful manner.

In some arrangements, a valve plug for a flow control valve includes a body portion extending from back end to a tapered nose portion for seating against a valve seat, and at least one balance port through an outer surface of the tapered nose portion. The balance port is vented through the valve plug to equalize a first pressure along the tapered nose portion with a second pressure at the back end of the valve plug body. A shoulder may be at a junction of the body portion and the tapered nose portion, wherein the outer surface of the tapered nose portion extends from the shoulder to a tip. The balance port may be disposed between the shoulder and the tip. The balance port may be spaced a first distance from the shoulder and a second distance from the tip. The valve plug may include a second balance port or more balance ports through the outer surface of the tapered nose portion. The valve plug may have a central bore extending along the body portion of the valve plug. One or more of the balance ports may connect to the central bore to vent through the valve plug to via the central bore. The valve plug may include an axial bore extending from each balance port axially through the valve plug. Each balance port may vent through the valve plug separately from any other balance port via the respective axial bores.

In some arrangements, a valve trim for a flow control valve includes an orifice with a flow passage defined by an inner wall surface extending from an inlet to an outlet, and a valve plug according to any one of the previous claims. The valve plug may reciprocate linearly into the flow passage to control the flow of fluid through the flow passage. The balance port may be spaced downstream of a throat defined by the smallest gap between the outer surface of the valve plug and the inner wall surface of the flow passage. The shoulder may seat against the valve seat. The valve trim may be adapted for use in a high recovery valve. The inner wall surface of the orifice may define a converging section, a diverging section, and/or a vena contracta between the converging section and the diverging section. The valve plug may reciprocate linearly, for example into the converging section of the flow passage. The valve seat may be disposed along the converging section of the flow passage.

In some arrangements, a valve includes a valve body defining a fluid flow path extending from an inlet to an outlet, and a valve trim of the present disclosure operatively disposed in the valve body to control flow of fluid along the fluid flow path. The valve body may be an angle valve body. The valve may be a sliding stem valve. The valve may have a valve stem coupled to the valve plug. The valve stem may move the valve plug, for example, linearly toward and away from the valve seat to control the flow of fluid through the fluid flow path.

In some arrangements, a method of reducing stem forces on a valve stem of sliding stem valve is provided. The sliding stem valve may be provided according to any of the arrangements and/or include any of the features disclosed herein. For example, the sliding stem valve may include a valve plug coupled to the valve stem. The valve plug may be arranged to reciprocate linearly toward and away from a valve seat disposed along an inner wall surface of a flow control orifice. The valve plug may have a body portion extending from a back end to a tip. A flow of fluid between the valve plug and the inner wall of the flow control orifice may be directed such that the tip of the valve plug is on the downstream side of the valve plug. A throat may be formed between an outer surface of the valve plug and the inner surface of the orifice. The throat may be located along a tapered nose portion of the plug. The tapered nose portion may extend from a shoulder of the valve plug to the tip of the valve plug. A first pressure at the back end of the body portion may be equalized with a second pressure at point located between the throat and the tip of the valve plug. Equalizing the pressures may include venting fluid from a location on the outer surface of the valve plug along the tapered nose portion. Venting the fluid may include venting the fluid through a balance port extending through the outer surface of the tapered nose portion. The balanced port may be spaced a first distance from the shoulder and a second distance from the tip.

Figure 3:
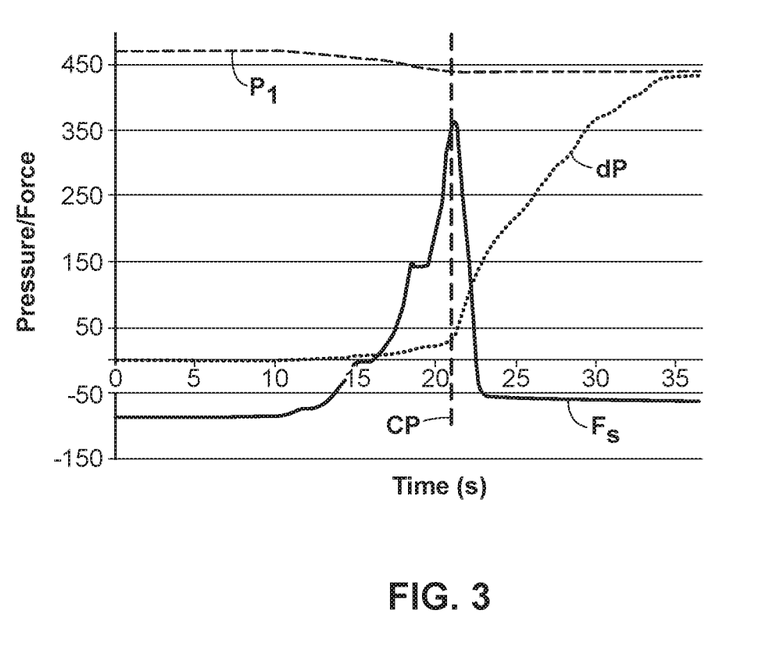
FIG. 3 illustrates test data relative to the effects of flow induced stem forces on a high recovery angle body valve having a high recovery valve plug and throat with a balance port bored through and along the axial center line of the valve plug.

Turning again to the drawings, FIG. 3 shows a graph of the pressure and force relative to time obtained during testing of a high recovery angle body valve (i.e., an angle body valve with a high recovery trim) during which stem force data was taken on a standard balance port valve plug. The effects of flow-induced stem force observed during these tests was evaluated. In the graph of FIG. 3, data path Fs illustrates the stem force (in pounds) acting on the valve stem, data path P1 illustrates the stagnation pressure P1 (in pounds per square inch, gauge) on the upstream side of the throat, data path dP illustrates the pressure differential (in pounds per square inch, differential) between the stagnation pressure P1 and the back pressure P2 across the throat, and line CP shows the 98% choke point of the valve. As shown by data path Fs, the peak stem force occurred at the pressure conditions when the valve became choked, i.e., at or very near to line CP. Although this trend is present at all travels of the valve plug, the peak stem force has the most amplitude at 80% travel of the valve plug.

Pressure distributions for fluid flow along a converging-diverging nozzle for different back pressures P2 are well understood. For purposes of the present disclosure, it is important relative to such pressure distributions to understand that once the flow at the nozzle throat becomes sonic, and that as the nozzle expands downstream, the back pressure continues to decrease. The present applicants have found that this effect, along with the location of a balance port in the valve plug, may create the spike in stem force on the valve stem as illustrated by the data path Fs of FIG. 3.

In the high recovery angle body valve tested relative to FIG. 3, a valve trim was used in which the valve plug included a balance port through the axial center of the end face of the valve plug and a bore that vents back from the balance port through the body of the valve plug. The valve trim was arranged in a flow down arrangement, such that valve plug is on the upstream side of the throat. The valve plug has a generally cylindrical shape with a tapered tip that extends into and seals against a radial valve seat formed on the inner circumferential surface of a conical orifice. In this arrangement, the throat of the valve is at the point where the outside diameter of the valve plug starts to taper into the tip. The balance port, in this case, is at the very tip of the valve plug and actually removes the very apex of the tip. The valve starts to choke when the velocity of the gas at the throat reaches Mach 1. The tests showed that the more the pressure drop dP across the valve increases, the more the pressure down the valve plug tip decreases. This effect remains true until the sonic pressure wave reaches the balance port at the tip, after which the pressure equalizes above the valve plug through the balance port and bore and the system is balanced. This is what appears to cause the spike in the stem force data Fs shown in FIG. 3.

Figure 4:
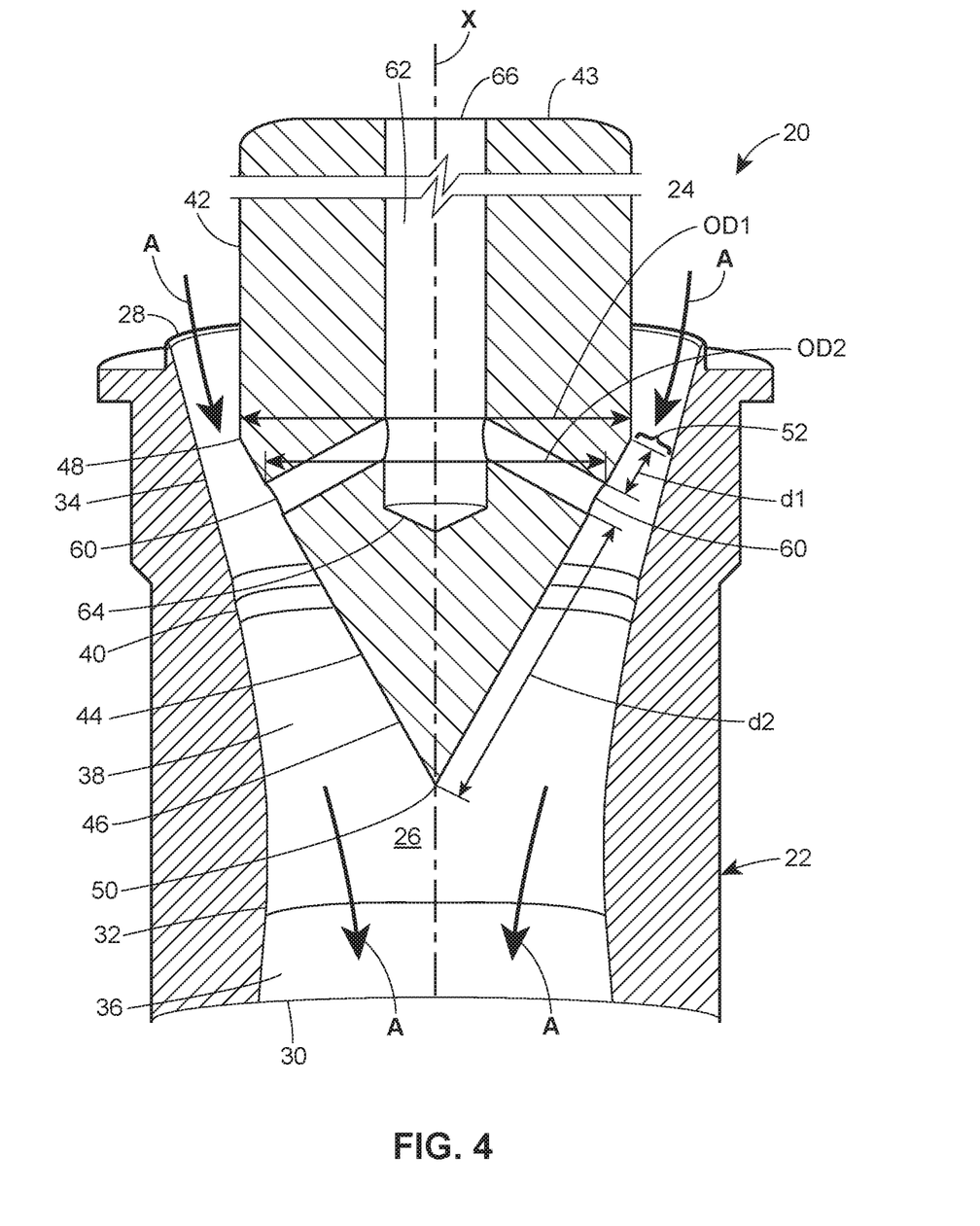
FIG. 4 is a simplified enlarged cross-sectional representation of valve trim with a valve plug having a balance port in accordance with the present disclosure arranged in an exemplary arrangement.
Figure 5:
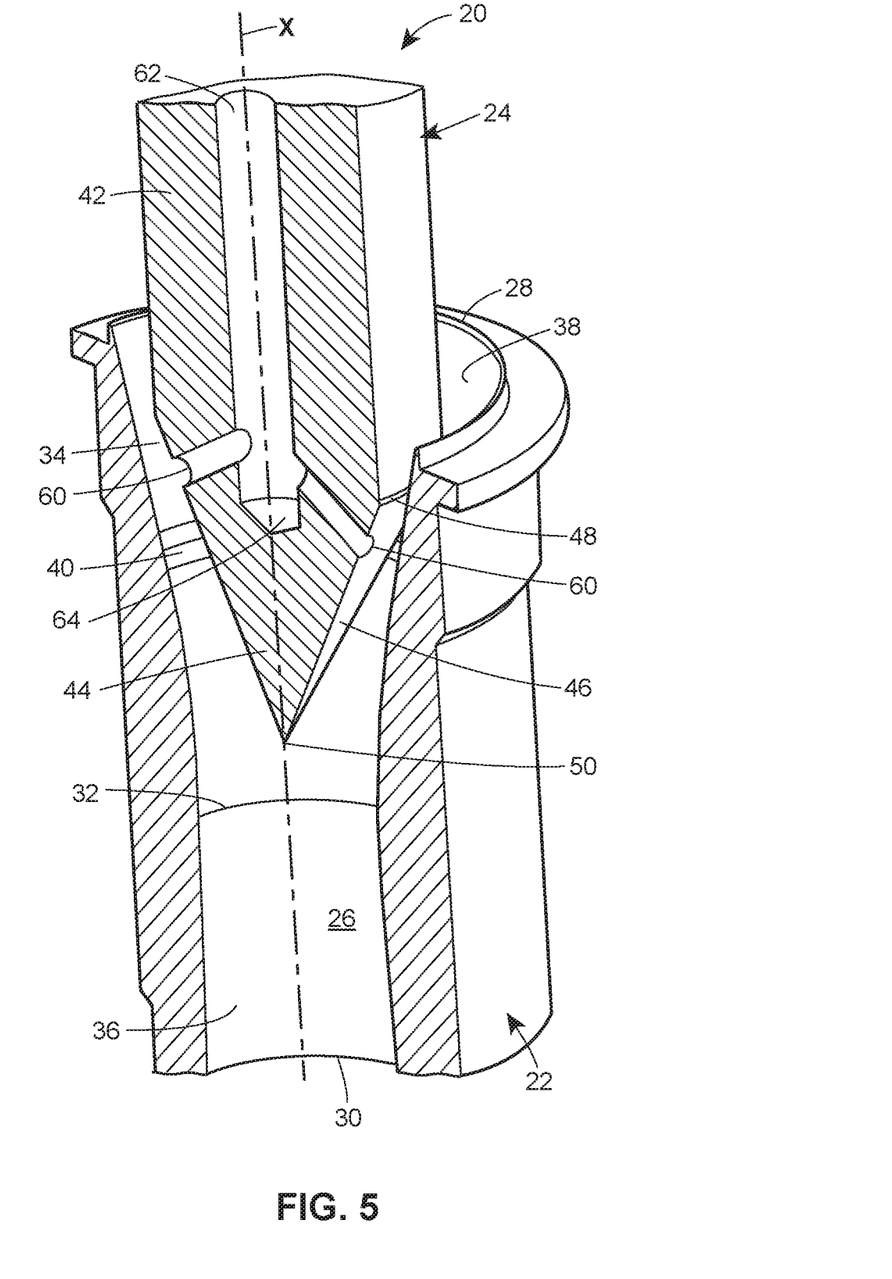
FIG. 5 is a simplified enlarged perspective representation in cross-section of the valve trim of FIG. 4.

Turning now to specific examples of the drawings, FIGS. 4 and 5 illustrate portions of a valve trim 20 for a high recovery valve according to the teachings of the present disclosure in a first exemplary arrangement. In these examples, the valve trim 20 is shown to include an orifice 22 and a valve plug 24. Additional components of a typical valve trim and the corresponding valve body of the high recovery valve are not shown for clarity. However, the valve trim 20 is to be part of a flow control valve, and the valve trim 20 may be assembled along with the remaining components of such a flow control valve and the corresponding valve trim components, as would be understood in the art. The valve trim 20 is preferably integrated as part of a high recovery valve, and the following examples and description focus primarily on such an arrangement. In one arrangement, the valve trim 20 may be integrated as part of a high recovery angle body valve, which is an angle body valve that is also a high recovery valve. However, the valve trim 20 may be used with other types of high recovery valves, such as a globe valve, and is not limited to the specific valve types explicitly illustrated and/or described herein. Furthermore, the teachings of the present disclosure need not be limited to use with a high recovery angle body valve or even with a high recovery valve.

A valve with the valve trim 20 may be particularly well-suited for controlling the flow of a fluid in a gaseous state, such as steam, liquid natural gas, and/or other gases. However, the valve with the valve trim 20 may also be used for controlling the flow of fluids in a liquid state. In this particular arrangement, the valve trim 20 is arranged in a flow down application, and the flow of fluid is in the direction of the arrows A, having an inflow into the orifice 22 at the inlet 28 and an outflow exiting the orifice 22 at the outlet 30. Thus, the valve plug 24 is on the upstream side of fluid flow through the valve.

The orifice 22 forms a flow passage 26 defined by an inner wall surface 38 extending from an inlet 28 to an outlet 30. The orifice 22 has a vena contracta 32 disposed between a converging section 34 and a diverging section 36. The vena contracta 32, converging section 34, and diverging section 36 are disposed along and/or defined by the inner wall surface 38. In the converging section 34, the inner wall surface 38 converges radially inwardly, i.e., becomes more restricted, from the inlet 28 toward the vena contracta 34. In the diverging section 36 the inner wall surface 38 diverges radially outwardly, i.e., becomes less restricted, from the vena contracta 34 to the outlet 30. A valve seat 40 is disposed along the inner wall 38 in the converging section 34. The valve seat 40 forms a ring that extends all the way around the flow passage 26 in the inner wall surface 38. In this arrangement, the valve seat 40 is a flattened portion of the inner wall surface 38 specially shaped to correspond and conform to a corresponding portion of the valve plug 24. However, the valve seat 40 may take other forms that are also suitable for forming a valve seat for the valve plug 24.

The valve plug 24 has a body portion 42 extending along a longitudinal axis X from a back end 43 to a tapered nose portion 44. The tapered nose portion 44 extends from a shoulder 48 at the lower end of the body to a tip 50 at the distal end of the valve plug 24. The body portion 42 in this arrangement has a generally cylindrical shape. However, the body portion 42 may have other shapes. The tapered nose portion 44 has a tapered outer surface 46 that extends from the shoulder 48 to the tip 50. In this example, the outer surface 46 has a generally conical shape. However, the outer surface 46 may have other shapes that taper from the shoulder 48 generally inwardly toward the tip 50. In this example, the tip 50 has a sharp point, however the tip 50 may have a rounded end. The shoulder 48 in this arrangement is sized and shaped to seat against the valve seat 40 when the valve plug 24 is in a fully closed position. The shoulder 48 in this example is shown to have a sharply angled profile, however the shoulder 48 may have a rounded profile. When the valve plug 24 is in an open position, as illustrated in FIG. 4, a throat 52 is formed at the narrowest gap between the shoulder 48 and the inner wall surface 38 along the converging section 34. Therefore, the throat 52 is the location of highest velocity of fluid flow along the flow passage 26.

One or more balance ports 60 are disposed in the outer surface 46 of the tapered nose portion 44. Each balance port 60 is spaced between the shoulder 48 and the tip 50 such that there is a first distance d1 along the outer surface 46 from the shoulder 48 to the balance port 60 and a second distance d2 along the outer surface 46 from the balance port 60 to the tip 50. The distance d1 may be the same or different than the distance d2. Preferably, the distance d1 is sufficient to locate the balance port 60 downstream from the throat 52. It is expected that in most arrangements, the distance d1 will be shorter than the distance d2. However, in some arrangements, the distance d1 may be equal to the distance d2, or the distance d1 may be greater than the distance d2, depending on the geometry of the valve trim 20 and the expected operating conditions of the valve. Where the valve plug 24 has two or more balance ports 60, the distance d1 may be the same for each balance port 60, or the distance d1 may be different for different balance ports 60. The one or more balance ports 60 with the shortest distance d1 may be considered the uppermost balance port 60 as viewed in the drawings. In the example of FIGS. 4 and 5, the valve plug 24 includes two balance ports 60 symmetrically arranged on the outer surface 46 of the tapered nose portion 44. Each balance port 60 is the same distance d1 from the shoulder 48 and the same distance d2 from the tip 50. However, different numbers and arrangements of the balance ports 60 are also contemplated. For example, the valve plug 24 may have only a single balance port 60 or may have more than two balance ports 60. If only one balance port 60 is used, the balance port 60 may have a larger cross-sectional area; whereas if several balance ports 60 are used, the balance ports 60 may have smaller cross-sectional areas. Additional exemplary arrangements of balance ports 60 are shown hereinafter. However, it is to be understood that the exact number location and arrangement of balance ports 60 along the tapered nose portion 44 is not to be limited to these exemplary arrangements, but rather may be adjusted experimentally to obtain optimal or desired flow characteristics for any particular size and/or arrangement of valve trim for a given valve.

The balance ports 60 vent through the valve plug 24 to a location outside of the fluid flow stream through the valve. Preferably, the balance ports 60 vent to the back end 43 of the valve plug 24, i.e., the opposite end of the valve plug from the tip 50, such as to a chamber within the bonnet directly above the opposite end of the valve plug 24 where the valve stem connects to the valve plug 24. By being so vented, the balance ports 60 equalize the pressure at the location of the balance port 60 along the axis of the flow passage 26 with the pressure on the opposite end of the valve plug, thereby balancing the pressure forces generated by the pressures on opposite ends of the valve plug 24 and reducing the stem forces Fs acting on the valve stem. In the present example, the balance ports 60 extend radially inwardly from the outer surface 46 of the tapered nose portion 44 to a central bore 62. Thus, the balance ports 60 in this arrangement are in the form of through bores extending from the outer surface 46 to the central bore 62. The balance ports 60 are also angled upwardly from the outer surface 46 to the central bore 62, although, such angle may not be necessary. The central bore 62 in this case is a blind bore that extends axially along the central axis X of the body portion 42 of the valve plug 24 from an end wall 64 disposed inside the tapered nose portion 44 to an opening 66 in the back end 43 of the body portion 42. Thus, the balance ports 60 vent through the valve plug 24 along the central bore 62.

The amount of initial unbalanced area against which the pressure differential dP across the throat 52 can act is the area between the outer diameter OD1 of the body portion 42 at the shoulder 48 and the outer diameter OD2 of the tapered nose portion 44 at the upper edge of the uppermost balance port 60 in the plane perpendicular to the axis X of the valve plug 24. Therefore, the balance characteristics of the trim 20 can be adjusted by adjusting the location of the uppermost balance port 60 between the shoulder 48 and the tip 50 and/or varying the number, size, and locations of one or more balance ports 60 along the outer surface 46 of the tapered nose portion 44.

By locating the balance ports 60 along the outer surface 46 part way between the throat 52 and the tip 50, rather than locating the uppermost balance port only at the tip 50, it is believed that the extreme spike in stem forces Fs at the chokepoint as illustrated in FIG. 3 may be significantly reduced. The effect of this reduction in stem forces Fs may improve the performance of the valve and/or may reduce wear on the valve.

The location of the balance ports 60 relative to the throat 52 may have a significant influence on the performance and stem forces Fs generated on the valve plug 24. Without being bound by theory, it is believed that the balance ports 60, or at least the balance port 60 nearest the shoulder 48 (the uppermost balance port 60), should be close to the throat 52. However, it is believed that the uppermost balance port 60 should not be so close to the throat 52 that the balance port 60 would affect the pressure recovery on the downstream side of the throat 52.

In addition, by spacing the balance ports 60 away from the tip 50, the outer surface 46 can converge together, for example to a sharp point or a rounded distal end, at the tip 50. By thus preserving the convergence of the outer surface 46 at the point 50 rather than cutting way the point 50, for example by extending the central bore 62 all the way through the outer surface 46 at the distal end of the tapered nose portion 44, the valve plug 24 allows expansion of the fluids on the downstream side of the valve plug 24 to occur more gradually. This more gradual expansion may further reduce cavitation of the fluid or other pressure spikes on the outlet side of the valve plug 24.

Figure 6:
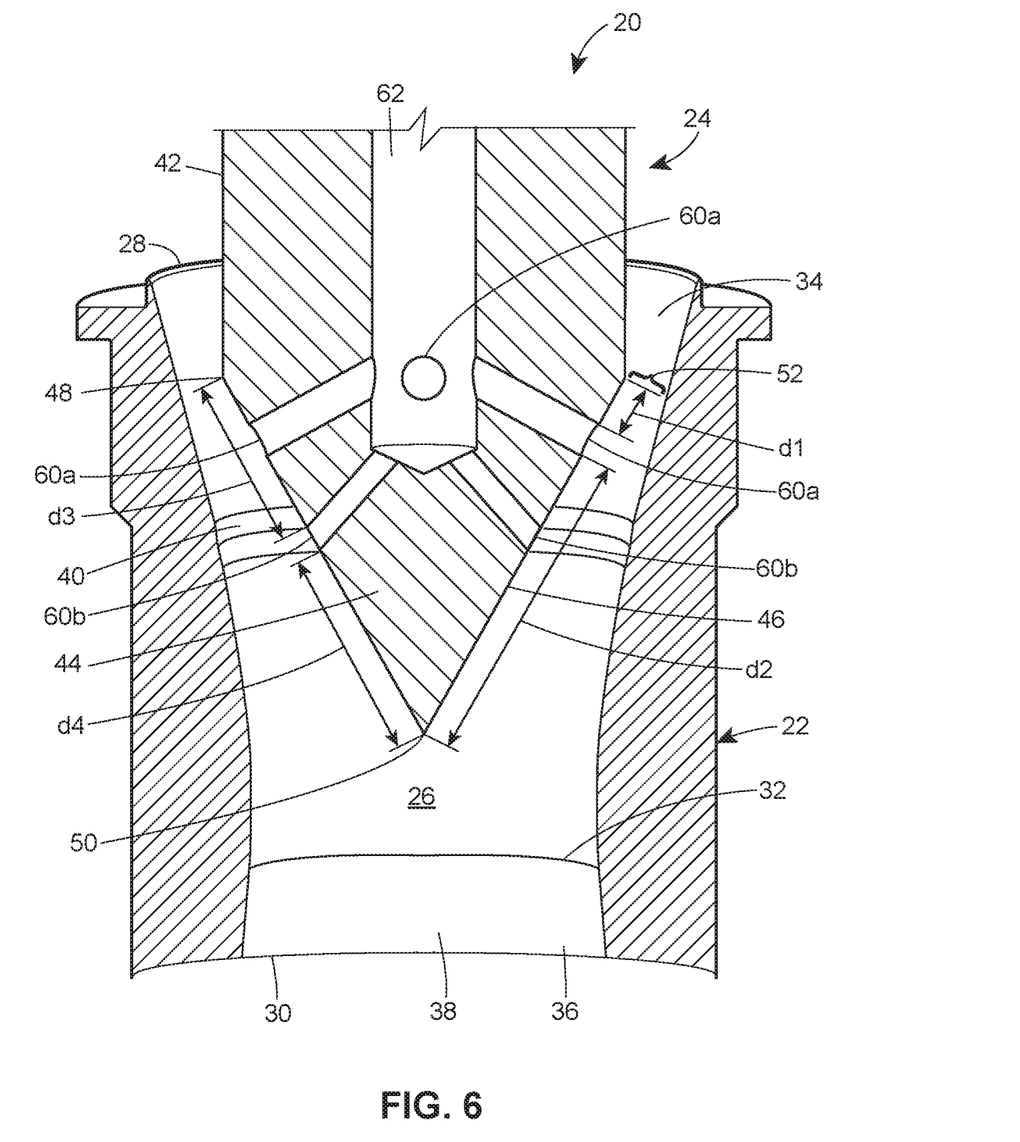
FIG. 6 is a simplified enlarged cross-sectional representation of valve trim with a valve plug having a balance port in accordance with the present disclosure arranged in another exemplary arrangement.

FIG. 6 shows a variation on the valve trim 20 in which the valve plug 24 includes a different arrangement of the balance ports 60 along the outer surface 46 of the tapered nose portion 44. Except as described hereinafter, the valve plug 24 and the orifice 22 are substantially the same as in the valve trim 20 shown in FIGS. 4 and 5. Therefore, for brevity the same reference signs have been used for the same features, and the reader is invited to refer to the descriptions thereof provided previously herein.

In this example, the valve plug 24 includes a first set of balance ports 60a and a second set of balance ports 60b. Each of the balance ports 60a and 60b extends through the outer surface 46 and into the central bore 62. Each of the first balance ports 60a is spaced a first distance d1 from the shoulder 48 and a second distance d2 from the tip 50 along the outer surface 46 of the tapered nose portion 44. Each of the second balance ports 60be is spaced a third distance d3 from the shoulder 48 and a fourth distance d4 from the tip 50 along the outer surface 46 of the tapered nose portion 44. In this example, three of the first balance ports 60a are visible, although there may be four or more of the first openings 60a spaced circumferentially around the outer surface 46 of the tapered nose portion 44. In addition, two of the second balance ports 60b are visible, although there may be more than two or only one of the second balance ports 60b. Thus, the first balance ports 60a are spaced apart circumferentially in a ring extending around outer surface 46 of the tapered nose portion 44. The second balance port 60b also lie in a ring extending around the outer surface 46 of the tapered nose portion 44 spaced downwardly from the ring of the first balance ports 60a. Of course, additional balance ports 60 may also be disposed along the outer surface 46 that do not lie in one of the rings of the first or second balance ports 60a or 60b. Further, the first and/or second balance ports 60a,b do not necessarily have to lie in rings.

When the valve plug 24 includes more than one balance port 60, the balance ports may have the same area, or the balance ports may have different areas. In the arrangement of FIGS. 4 and 5, each of the balance ports 60 has the same area. In the arrangement of FIG. 6, the first balance ports 60a have a different area than the second balance ports 60b. In addition, where the balance ports 60 are in the form of radial through bores, for example as shown in each of FIGS. 4-6, each of the balance ports 60, if in the form of circular bores, may have the same inside diameter, or different ones of the balance ports 60 may have different inside diameters. Further still, although the balance ports 60 preferably have a circular cross-section for ease of formation, for example by drilling, the balance ports 60 may have cross-sections of different shapes, such as oval, rectangular, triangular, polygonal, etc.

Figure 7:
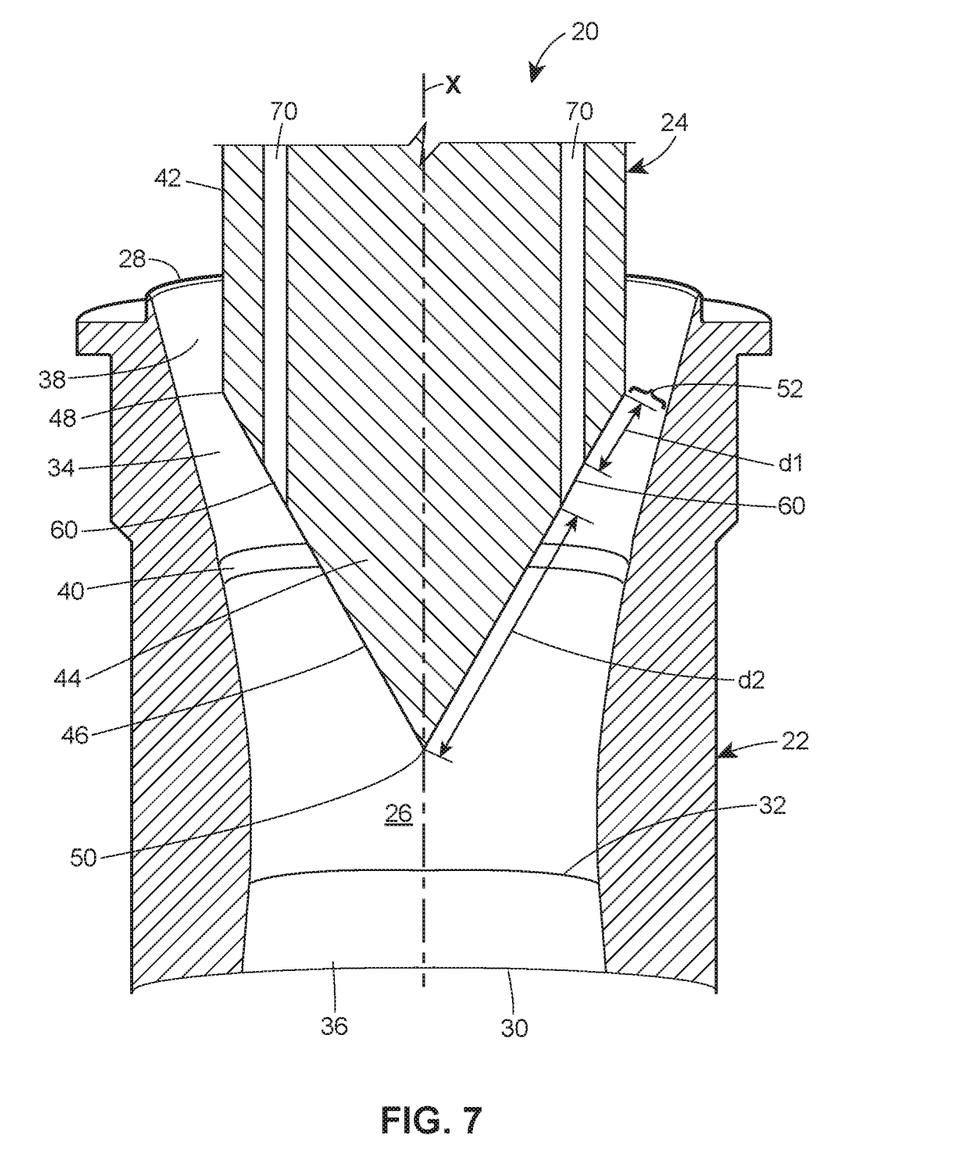
FIG. 7 is a simplified enlarged cross-sectional representation of valve trim with a valve plug having a balance port in accordance with the present disclosure arranged in a yet further exemplary arrangement.

FIG. 7 shows a variation on the valve trim 20 in which the valve plug 24 includes a different arrangement of the venting path for the balance ports 60. Except as described hereinafter, the valve plug 24 and the orifice 22 are substantially the same as in the valve trim 20 shown in FIGS. 4 and 5. Therefore, for brevity the same reference signs have been used for the same features, and the reader is invited to refer to the descriptions thereof provided previously herein.

In this example, each balance port 60 vents along a separate axial bore 70 instead of venting through a single, central bore 62 as in the previous examples. Thus, the valve plug 24 has one or more, and in this example two, balance ports 60 through the outer surface 46 of the tapered nose portion 44 downstream from the throat 52, as described previously herein. An axial bore 70 extends from each balance port 60 axially toward the back end 43 of the be body portion 42 of the valve plug 24. The axial bore 70 may be in the form of a through bore extending from the balance port 60 to an opening in the back end of the valve plug 24. The axial bore 70 may be parallel with the longitudinal axis X of the valve plug 24, or the axial bore 70 may be disposed at a non-parallel angle to the longitudinal axis X. The axial bore 70 may have a straight axis, or may have one or more bends, curves, or angled junctions along its axis.

These are just some of the nearly infinite variety of variations on placement, number, and arrangement of the balance ports 60 through the outer surface 46 of the tapered nose portion 44 of the valve plug 24. In addition, the valve trim 20 may be used in a wide variety of valve types to provide a high recovery valve.

Figure 8:
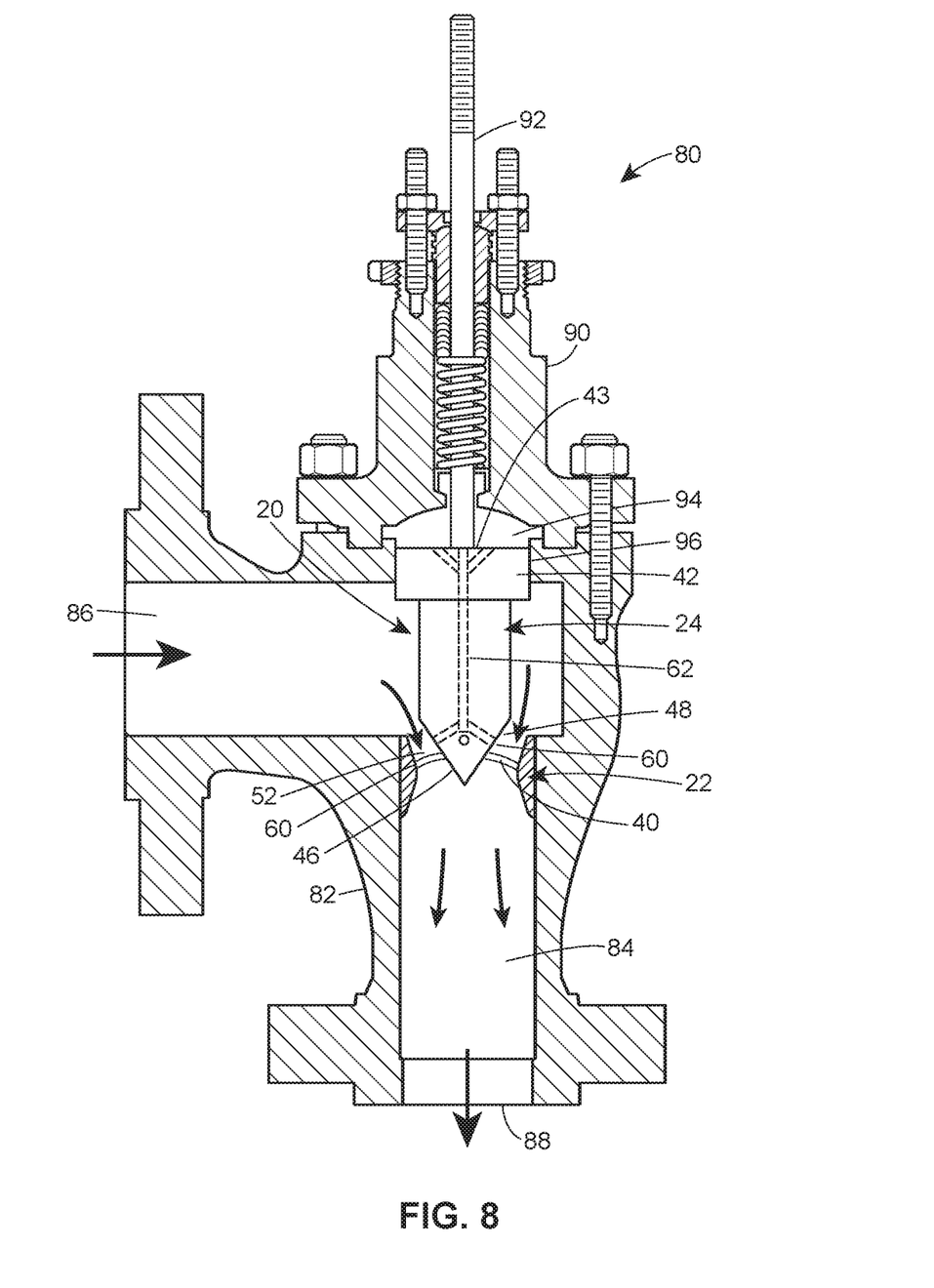
FIG. 8 illustrates a high recovery angle body valve having a valve plug with a balance port arranged in accordance with the present disclosure.

FIG. 8 illustrates a high recovery valve 80 including the valve trim 20 with a valve plug 24 according to the present disclosure. The valve 80 is a sliding-stem angle body valve, which has an angle valve body 82 that defines a fluid flow path 84 having an inlet portion 86 that is angled relative to an outlet portion 88, for example at a 90 degree angle. A bonnet 90 is coupled to the valve body 82 opposite the outlet portion 88. A valve stem 92 extends through the bonnet. The valve stem 92 is aligned with and reciprocates along the longitudinal axis of outlet portion 88 of the fluid flow path 84. The back end 43 of the valve plug 24 is coupled to the distal end of the valve stem 92. The orifice 22 is disposed in the outlet portion 88 of the fluid flow path 84. The longitudinal axis X of the valve plug 24 is aligned with the longitudinal axes of the orifice 22, the valve stem 92, and the outlet portion 88 of the fluid flow path 84. The valve stem 92 moves the valve plug 24 linearly toward and/or away from the valve seat 40. When the valve 80 is in a fully closed position, the shoulder 48 of the valve plug 24 is seated against the valve seat 40. When the valve is in an open position, the valve plug 24 retracted away from the valve seat 40, thereby forming a gap and the throat 52 between the outer surface 46 of the tapered nose portion 44 and the converging section 34 of the inner wall surface 38 of the orifice 22.

In this example, the balance ports 60 vent into a chamber 94 behind the back end 43 of the valve plug 24. The chamber 94 is separated from the fluid flow path 84 by a seal formed between the back end of the body portion 42 and a guiding bore 96, such as a cage or bore formed by the valve body 82.

In operation of valve 80, the valve plug 24 reciprocates linearly toward and/or away from the valve seat 40 to control the flow of fluid along the fluid flow path 84 from the inlet 86 to the outlet 88. Thus, the tip 50 is on the downstream side of the valve plug 24. When the valve plug 24 is partly but not completely blocking the inlet 28 of the orifice 22, the throat 52 is formed between the outer surface 46 and the inner surface 38 of the orifice 22. Normally, the throat is located along the tapered nose portion 44 of the valve plug 24. A first pressure at the back end 43 of the body portion 42 is equalized with a second pressure at a point located between the throat 52 and the tip 50 of the valve plug 24. To equalize the first and second pressure, fluid from a location on the outer surface of the valve plug along the tapered nose portion is vented. The fluid may be vented, for example, through one or more of the balance ports 60 extending through the outer surface 46 of the tapered nose portion 44. However, in some methods, other mechanisms for venting the second pressure at a point between the throat 52 and the tip 50.

The teachings relative to the valve plug 24, and in particular the placement of balance ports 60 in the valve plug 24 need not be limited to a high recovery valve or in combination with an orifice having a converging-diverging nozzle shape, like the orifice 24. Rather, the teachings relative to the valve plug 24 may be used with other shapes and types of flow control orifices, which may or may not be considered components of a "high recovery" valve. For example, the valve plug 24 with balance ports 60 may be used with a simple cylindrical flow control orifice and/or seat ring.

A valve, valve trim, valve plug, and/or method according to the present disclosure may allow the pressure balance to occur sooner by placing the balance ports closer to the orifice throat as well as allowing the valve plug tip to be pointed, which allows the expansion of the fluid in orifice downstream of the throat to happen more gradually. With these two features, the valve may have better recovery performance as well as a smaller spike in stem force through the choked flow transition point, especially when used in a high recovery valve. Experimentation on balance port location and size could be used to determine the most efficient or a particularly desirable geometry. A valve, valve trim, valve plug, and/or method according to the present disclosure may reduce wear on actuation and improve reliability. A valve, valve trim, valve plug, and/or method according to the present disclosure may allow a high recovery angle valve to have a more progressive expansion angle, which may improve recovery, while also reducing the peak force applied on the stem by fluid flow over the valve plug. A valve, valve trim, valve plug, and/or method according to the present disclosure may be well suited for use along a high pressure gas line, such as a steam line or natural gas line or other high pressure gas. A valve, valve trim, valve plug, and/or method of the present disclosure may be well suited for use under operating conditions where sonic or supersonic operating conditions within or near the valve are contemplated. Other uses, technical effects, and/or advantages of a valve, valve trim, valve plug, and/or method according to the present disclosure may also be present.

This detailed description is to be construed as exemplary only and does not describe every possible embodiment or combination, as describing every possible embodiment and combination would be impractical, if not impossible. One could implement numerous alternate embodiments and combinations, using either current technology or technology developed after the filing date of this application. Thus, while specific exemplary forms are illustrated and described herein, it is to be understood that any of the various aspects, arrangements, and/or features disclosed herein may be combined with any one or more of the other aspects, arrangements, and/or features disclosed herein in a manner that would be understood by a person of ordinary skill in view of the teachings of this disclosure.

I claim:

1. A valve trim for a flow control valve, comprising:
an orifice with a flow passage defined by an inner wall surface extending from an orifice inlet to an orifice outlet;
a valve seat along the inner wall surface; and
a valve plug that reciprocates linearly into the flow passage to control the flow of fluid through the flow passage,
wherein the valve plug comprises a body portion extending from a back end to a tapered nose portion that seats against the valve seat, the tapered nose portion has a tip at a distal end, and a balance port extends through an outer surface of the tapered nose portion, wherein the balance port is vented through the valve plug to equalize a first pressure along the tapered nose portion with a second pressure at the back end of the valve plug body, and wherein the balance port is spaced apart from the tip;
a shoulder at a junction of the body portion and the tapered nose portion, wherein the outer surface of the tapered nose portion extends from the shoulder to the tip; and
wherein the balance port is disposed between the shoulder and the tip, the balance port spaced a first distance from the shoulder and a second distance from the tip, the second distance being greater than the first distance, and the balance port is spaced downstream of a throat defined by the smallest gap between the outer surface of the tapered nose portion and the inner wall surface of the flow passage.

2. The valve trim of claim 1, wherein the shoulder seats against the valve seat.

3. The valve trim of claim 1, wherein the valve plug further comprises a second balance port through the outer surface of the tapered nose portion.

4. The valve trim of claim 3, further comprising an axial bore extending from each balance port axially through the valve plug, wherein each balance port vents through the valve plug separately from any other balance port via the respective axial bores.

5. The valve trim of claim 1, wherein the orifice and the valve plug are part of a high recovery valve.

6. The valve trim of claim 5, wherein the inner wall surface of the orifice defines a converging section, a diverging section, and a vena *contracta* between the converging section and the diverging section, the valve plug reciprocates linearly into the converging section, and the valve seat is disposed along the converging section of the inner wall surface.

7. A valve, comprising:
a valve body defining a fluid flow path extending from an inlet to an outlet;
an orifice with a flow passage defined by an inner wall surface extending from an orifice inlet to an orifice outlet, wherein the inner wall surface of the orifice defines a converging section, a diverging section, and a vena *contracta* between the converging section and the diverging section;
a valve seat disposed along the converging section of the inner wall surface; and
a valve plug that reciprocates linearly into the converging section to control the flow of fluid through the flow passage and the fluid flow path,
wherein the valve plug comprises a body portion extending from a back end to a tapered nose portion that seats against the valve seat, the tapered nose portion has a tip at a distal end, and a balance port extends through an outer surface of the tapered nose portion, wherein the balance port is vented through the valve plug to equalize a first pressure along the tapered nose portion with a second pressure at the back end of the valve plug body, and wherein the balance port is spaced apart from the tip;
a shoulder at a junction of the body portion and the tapered nose portion, wherein the outer surface of the tapered nose portion extends from the shoulder to the tip; and
wherein the balance port is disposed between the shoulder and the tip, the balance port spaced a first distance from the shoulder and a second distance from the tip, the second distance being greater than the first distance.

8. The valve of claim 7, wherein the valve body comprises an angle valve body.

9. The valve of claim 7, wherein the valve comprises a sliding stem valve including a valve stem coupled to the valve plug, wherein the valve stem moves the valve plug linearly toward and away from the valve seat to control the flow of fluid through the fluid flow path.

10. The valve of claim 7, wherein the valve plug comprises a first body portion and a second body portion, a bonnet coupled to the valve body, and a chamber formed by the first body portion and the bonnet, wherein the first body portion extends from the back end to the second body portion, the second body portion includes the tapered nose portion, and the first body portion abuts a portion of the valve body.

11. The valve of claim 7, wherein the tip is pointed and the tapered nose portion continuously tapers from a proximal end to the pointed tip.

12. A valve trim for a flow control valve, comprising:
an orifice with a flow passage defined by an inner wall surface extending from an orifice inlet to an orifice outlet, wherein the inner wall surface of the orifice defines a converging section, a diverging section, and a vena contracta between the converging section and the diverging section;
a valve seat disposed along the converging section of the inner wall surface; and
a valve plug that reciprocates linearly into the converging section to control the flow of fluid through the flow passage,
wherein the valve plug comprises a body portion extending from a back end to a tapered nose portion that seats against the valve seat, the tapered nose portion has a tip at a distal end, and a balance port extends through an outer surface of the tapered nose portion, wherein the balance port is vented through the valve plug to equalize a first pressure along the tapered nose portion with a second pressure at the back end of the valve plug body, and wherein the balance port is spaced apart from the tip;
a shoulder at a junction of the body portion and the tapered nose portion, wherein the outer surface of the tapered nose portion extends from the shoulder to the tip; and
wherein the balance port is disposed between the shoulder and the tip, the balance port spaced a first distance from the shoulder and a second distance from the tip, the second distance being greater than the first distance.

13. The valve trim of claim 12, further comprising a second balance port through the outer surface of the tapered nose portion.

14. The valve trim of claim 13, further comprising an axial bore extending from each balance port axially through the valve plug, wherein each balance port vents through the valve plug separately from any other balance port via the respective axial bores.

15. The valve trim of claim 13, wherein the shoulder seats against the valve seat.

16. The valve trim of claim 13, wherein the balance port is spaced downstream of a throat defined by the smallest gap between the outer surface of the valve plug and the inner wall surface of the flow passage.

17. The valve trim of claim 16, wherein the balance port is connected to a central bore extending through the body portion, the balance port vented through the central bore of the valve plug to equalize the first pressure with the second pressure.

18. A method of reducing stem forces on a valve stem of sliding stem valve having a flow control orifice defined by an inner wall surface extending from an orifice inlet to an orifice outlet, wherein the inner wall surface of the flow control orifice defines a converging section, a diverging section, and a vena contracta between the converging section and the diverging section, a valve plug coupled to the valve stem and arranged to reciprocate linearly toward and away from a valve seat disposed along the converging section of the inner wall surface of the flow control orifice, wherein the valve plug has a body portion extending from a back end to a shoulder at a junction of the body portion and a tapered nose portion, the tapered nose portion extending from the shoulder to a tip, the method comprising:
- directing a flow of fluid between the valve plug and the inner wall surface of the flow control orifice such that the tip of the valve plug is on the downstream side of the valve plug;
- forming a throat between an outer surface of the valve plug and the inner wall surface of the orifice, wherein the throat is located along the tapered nose; and
- equalizing a first pressure at the back end of the body portion with a second pressure at a point located between the throat and the tip of the valve plug by venting a fluid through a balance port extending through the outer surface of the tapered nose portion, wherein the balance port is spaced a first distance from the shoulder and a second distance from the tip, the second distance being greater than the first distance.

* * * * *

UNITED STATES PATENT AND TRADEMARK OFFICE
CERTIFICATE OF CORRECTION

| | | |
|---|---|---|
| PATENT NO. | : 10,094,488 B2 | Page 1 of 1 |
| APPLICATION NO. | : 14/974103 | |
| DATED | : October 9, 2018 | |
| INVENTOR(S) | : Trenton Frank Jackson | |

It is certified that error appears in the above-identified patent and that said Letters Patent is hereby corrected as shown below:

On the Title Page

Item [57], "may be use" should read -- may be used --.

In the Specification

Column 2, Line 14, "form" should read -- from --.

Column 2, Line 32, "may include may include" should read -- may include --.

Column 2, Line 45, "and or" should read -- and/or --.

Column 5, Line 19, "connical" should read -- conical --.

Column 6, Line 9, "vena contracta 34." should read -- vena contracta 32. --.

Column 6, Line 12, "vena contracta 34" should read -- vena contracta 32 --.

Column 9, Line 19, "the be" should read -- the --.

Signed and Sealed this
Twenty-first Day of April, 2020

Andrei Iancu
*Director of the United States Patent and Trademark Office*